US009644778B2

(12) United States Patent
Sato et al.

(10) Patent No.: US 9,644,778 B2
(45) Date of Patent: May 9, 2017

(54) DEVICE FOR WORK IMPLEMENTATION WITHOUT STOPPING FLOW, AND METHOD FOR WORK IMPLEMENTATION WITHOUT STOPPING FLOW

(71) Applicant: SUIKEN CO., LTD., Shiga (JP)

(72) Inventors: Yasunari Sato, Shiga (JP); Toshihiko Shimizu, Shiga (JP)

(73) Assignee: SUIKEN CO., LTD., Shiga (JP)

( * ) Notice: Subject to any disclaimer, the term of this patent is extended or adjusted under 35 U.S.C. 154(b) by 0 days.

(21) Appl. No.: 15/045,787

(22) Filed: Feb. 17, 2016

(65) Prior Publication Data
US 2016/0169434 A1 Jun. 16, 2016

Related U.S. Application Data

(63) Continuation-in-part of application No. PCT/JP2013/078177, filed on Oct. 17, 2013.

(51) Int. Cl.
F16L 55/18 (2006.01)
F16L 55/10 (2006.01)
(Continued)

(52) U.S. Cl.
CPC ............... *F16L 55/10* (2013.01); *F16K 3/02* (2013.01); *F16L 41/06* (2013.01); *F16L 41/16* (2013.01)

(58) Field of Classification Search
CPC ... Y10T 137/6123; F16L 41/06; F16L 47/345; F16L 55/105; F16L 55/10
(Continued)

(56) References Cited

U.S. PATENT DOCUMENTS 5,327,923 A * 7/1994 Eischen .................. F16K 43/00
137/15.14
5,732,728 A * 3/1998 Maichel ................ F16L 55/105
137/15.14
(Continued)

FOREIGN PATENT DOCUMENTS

JP 2000-179779 A 6/2000
JP 2004-069059 A 3/2004
(Continued)

OTHER PUBLICATIONS

International Search Report for corresponding International Application No. PCT/JP2013/078177 mailed Nov. 12, 2013.

Primary Examiner — Reinaldo Sanchez-Medina
(74) Attorney, Agent, or Firm — Renner, Otto, Boisselle & Sklar, LLP

(57) ABSTRACT

An apparatus including: a sealing case having a branch hole formed in a first separate case and extending in the radial direction of an existing pipe; and a rubber packing for sealing a gap between the sealing case and the existing pipe, wherein: the first separate case has a flange for attachment and removal of a boring machine; the sealing case reciprocates in a pipe axis direction; the rubber packing forms; a first sealed area surrounding a portion of the sealing case for shutting the branch hole; a second sealed area being adjacent to, sealed against, displaced from the first sealed area in the pipe axis direction, and sized so as to be able to shut the opening bored by a cutter; and a tolerance space, into which a second seal ring escapes, is formed between a packing attachment groove and the second seal ring.

8 Claims, 7 Drawing Sheets

(51) Int. Cl.
*F16L 41/06* (2006.01)
*F16L 41/16* (2006.01)
*F16K 3/02* (2006.01)

(58) Field of Classification Search
USPC .............................. 137/15.14, 317, 318, 319
See application file for complete search history.

(56) References Cited

U.S. PATENT DOCUMENTS

| | | | |
|---|---|---|---|
| 6,622,747 B2* | 9/2003 | Sato | F16L 41/04 137/15.09 |
| 8,047,219 B2* | 11/2011 | Puckett | F16L 55/124 137/15.12 |
| 8,720,465 B2* | 5/2014 | Sato | F16L 41/06 137/15.14 |
| 2001/0010233 A1* | 8/2001 | Sato | F16L 55/105 137/318 |
| 2001/0017159 A1 | 8/2001 | Sato et al. | |
| 2002/0007851 A1* | 1/2002 | Sato | F16L 41/06 137/318 |
| 2012/0160337 A1* | 6/2012 | Murphy | F16L 55/105 137/15.14 |
| 2012/0222753 A1 | 9/2012 | Sato et al. | |

FOREIGN PATENT DOCUMENTS

| | | |
|---|---|---|
| JP | 2001-330189 A | 11/2011 |
| JP | 2013-155816 A | 8/2013 |
| WO | WO 2011/099398 A1 | 8/2011 |

* cited by examiner

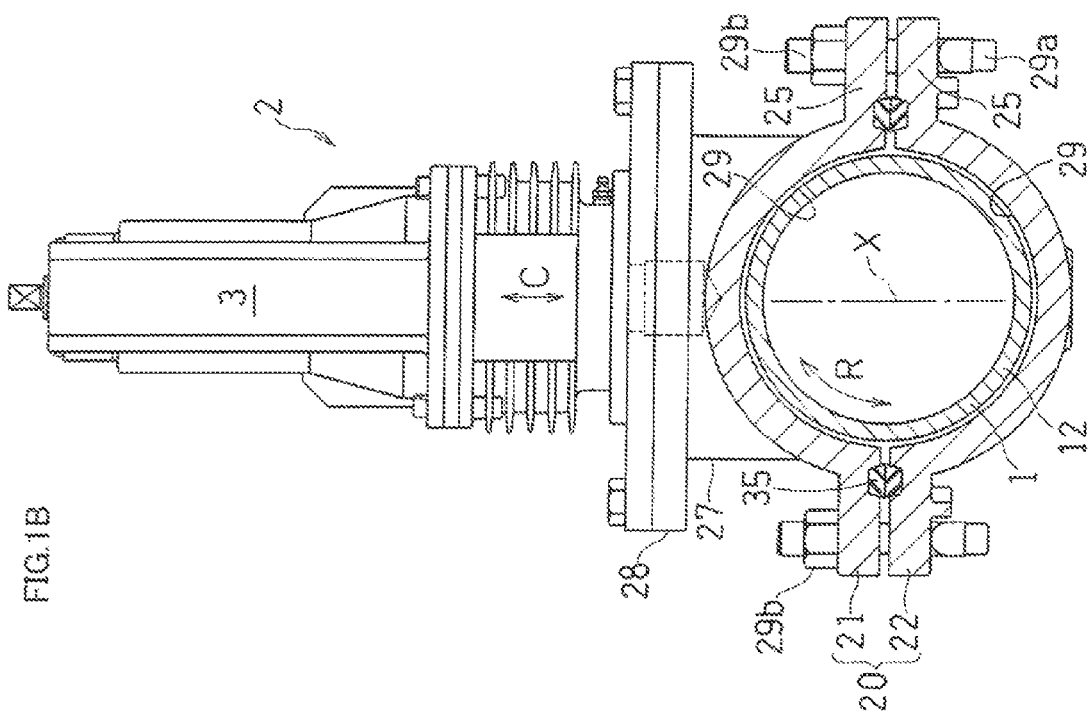
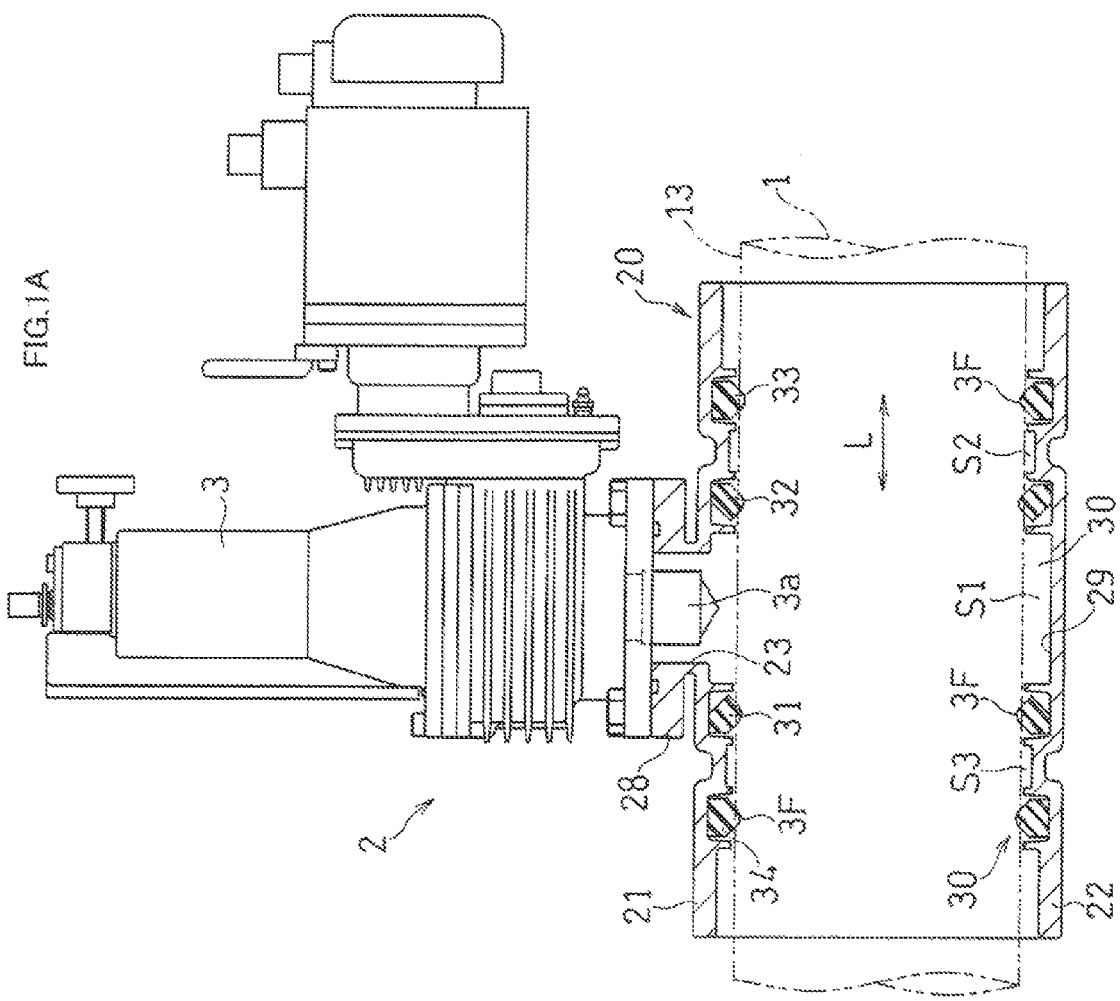

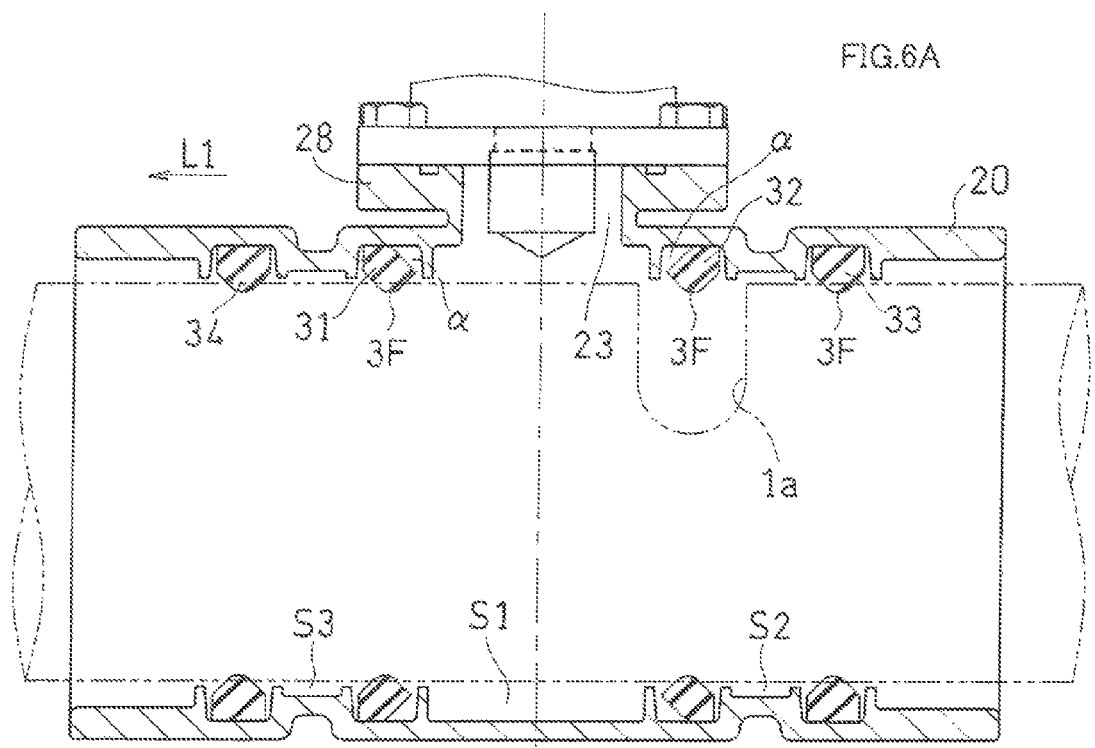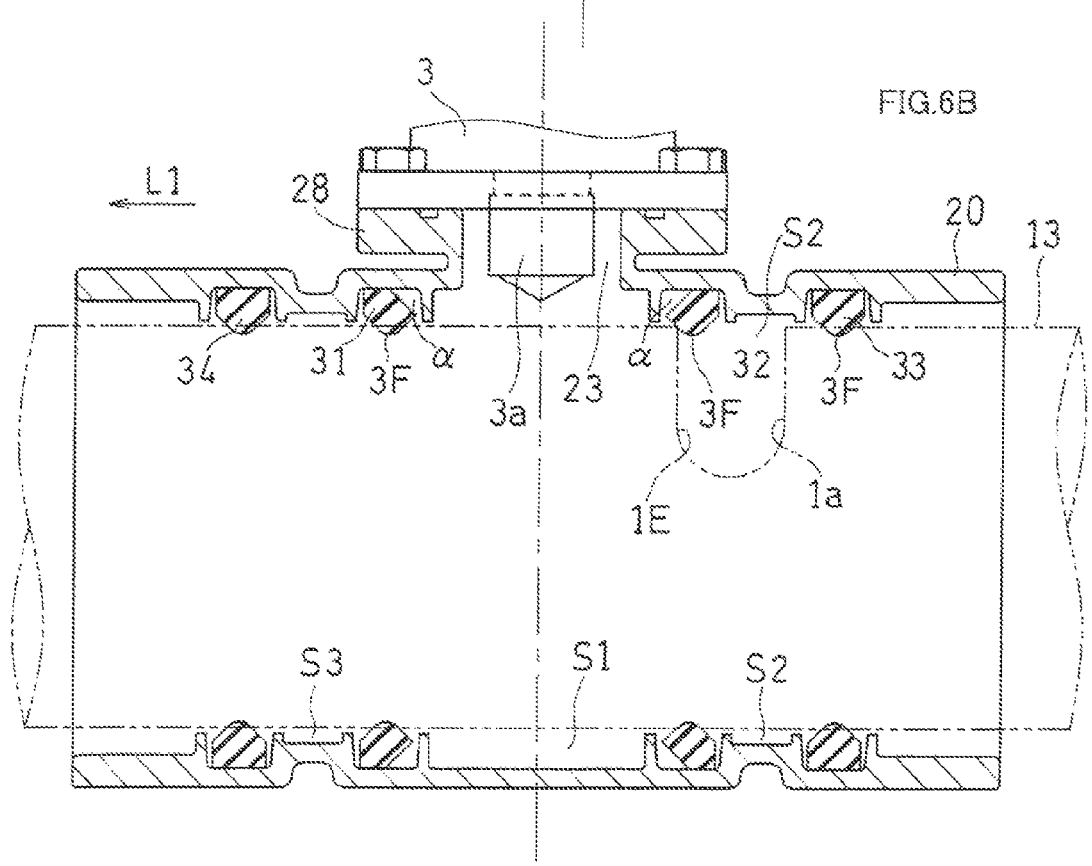

DEVICE FOR WORK IMPLEMENTATION WITHOUT STOPPING FLOW, AND METHOD FOR WORK IMPLEMENTATION WITHOUT STOPPING FLOW

CROSS-REFERENCE TO RELATED APPLICATIONS

This application is a continuation in part of the PCT international application No. PCT/JP2013/78177 filed on Oct. 17, 2013. The entire content of the international application is hereby incorporated herein by reference.

TECHNICAL FIELD

The present invention relates to a device for work implementation without stopping flow and method for work implementation without stopping flow, that is, relates to a flow-undisrupted apparatus and a flow-undisrupted process.

BACKGROUND ART

There are conventional processes well known in the art, in which an opening is formed in the existing pipe to insert a valve body into the line (passage) of the existing pipe, without disrupting the flow of a fluid through the existing pipe (see first and second patent documents).

CITATION LIST

Patent Document

[FIRST PATENT DOCUMENT] JP200G-179779A (Abstract)
[SECOND PATENT DOCUMENT] JP2004-69059A (Abstract)
[THIRD PATENT DOCUMENT] WO2011/099398A (Front page)

A conventional separate case disclosed in the first and second patent documents includes a first flange to which a cutting tool including a cutter, or the like, is attached, and a second flange to which a valve cover accommodating a valve body therein is attached, provided separately from each other in the pipe axis direction of the existing pipe.

The inside of the separate case is sealed, and after the existing pipe is bored with the cutter, the separate case is moved by a predetermined amount in the pipe axis direction of the existing pipe, and a valve body is inserted into the bored opening.

SUMMARY OF THE INVENTION

With the separate case of the first and second patent documents, since the first flange to which the cutter is attached and the second flange to which the valve cover is attached communicate with each other through the inside of the separate case, when the existing pipe is bored with the cutter, the water pressure in the existing pipe is exerted entirely across the inside of the case including the valve cover.

Therefore, it is necessary to provide an operation valve for removing the cutter.

Since an attachment area for the cutter and an attachment area for the valve cover need to be formed in the case, the structure is complicated and it is difficult to reduce the size.

In view of this, the present applicant has proposed a flow undisrupted apparatus allowing for simple and easy operations and allowing for a reduction in size, (the third patent document)

According to the preceding invention, three seal rings are used to form two sealed regions, and the three seal rings are reciprocated, together with the sealing case, in the pipe axis direction, thus eliminating the need for the operation valve.

However, when the three seal rings reciprocate while the three seal rings are pressed hard against the pipe wall of the existing pipe, a strong resistance is exerted on the existing pipe during the movement. This can lower the reliability of the operation, e.g., the seal ring coming out of the packing attachment groove.

Moreover, the seal ring for sealing between the sealing case and the surface of the existing pipe can easily be damaged by a sharp edge of an opening in the existing pipe when moving (passing) over the opening. This can also lower the reliability of the operation.

Thus, an object of the present invention is to improve the reliability of an operation of a flow-undisrupted process, or the like.

An apparatus of the present invention is a flow-undisrupted apparatus to which a boring machine including a cutter for boring a portion of a pipe wall of an existing pipe to form an opening in the pipe wall is attached, the flow-undisrupted apparatus allowing the boring machine to be removed therefrom after the opening is formed, the flow-undisrupted apparatus including:

a sealing case including a plurality of separate cases separated from one another in a circumferential direction of the existing pipe for enclosing a portion of the existing pipe; and a rubber packing for sealing a gap between the sealing case and the existing pipe, wherein:

a branch-shaped branch pipe portion is formed in a first separate case, which is one of the plurality of separate cases, the branch pipe portion defining a branch hole extending in a radial direction of the existing pipe;

the branch pipe portion of the first separate case is provided with a flange for allowing for attachment and removal of the boring machine;

the sealing case is capable of reciprocating in a pipe axis direction of the existing pipe; and the rubber packing forms:
a first sealed area surrounding a portion of the sealing case where the branch hole is provided for sealing the gap between the sealing case and the existing pipe around the branch hole; and
a second sealed area for temporarily shutting the opening bored by the cutter, the second sealed area being adjacent to the first sealed area, sealed against the first sealed area, and displaced from the first sealed area, in the pipe axis direction;

the rubber packing includes a first seal ring, a second seal ring, and a third seal ring, forming the first sealed area and the second sealed area;

each of the rings is attached to a corresponding packing attachment groove of the sealing case while being in contact with an outer periphery surface of the existing pipe; and between the second seal ring and the packing attachment groove placed between the two sealed areas, a tolerance (allowance) space is defined on a side of the branch hole of an outer periphery edge of the second, seal ring, the tolerance space allowing the second seal ring to deform, within the packing attachment groove, outward in the radial direction of the existing pipe.

The apparatus of the present invention may further include a gate valve body that is to be intruded into an inside of the existing pipe through the opening formed in the pipe wall so as to disrupt a flow of a fluid through the existing pipe; and a valve cover accommodating the gate valve body therein, the valve cover being coupled to the first separate case via the flange instead of the boring machine.

In the present invention, first and second sealed areas are provided, which do not communicate with each other. That is, the first sealed area and the second sealed area are sealed against each other so as not to communicate with each other. Therefore, when the existing pipe is bored with the cutter, the water pressure in the pipeline of the existing pipe is exerted on the first sealed area and is not exerted on the second sealed area. On the other hand, when the present apparatus is moved in the pipe axis direction, the water pressure in the pipeline is exerted on the second sealed area and is not exerted on the first sealed area.

By shutting the bored opening in the second sealed area, it is no longer necessary to additionally use an operation valve, allowing for a significant cost reduction.

It is possible to attach various devices such as boring machines and valve covers, branch pipes, etc., to the flange provided on the first separate case. Therefore, it is no longer necessary to provide two flanges, as opposed to conventional techniques, thus realizing advantages such as simplifying the structure and allowing for a reduction in size of the apparatus.

Particularly, in the present invention, during the movement, a portion of the second seal ring will deform while escaping into the tolerance space of the packing attachment groove. Therefore, the resistance dining the movement will decrease. Thus, the seal ring will unlikely come out of the packing attachment groove.

When the second seal ring starts passing over the opening, the portion, which has escaped into the tolerance space, projects toward the opening (inwardly).

Around when the second seal ring finishes passing over the opening, the projecting portion of the second, seal ring comes into contact with, the edge of the opening, rapidly increasing the resistance during the movement. Thus, the operator will easily be able to know that the opening has been sealed with the second sealed area including the second seal ring.

Thus, the second seal ring is unlikely damaged, improving the reliability of the operation.

On the other hand, a method of the present invention is a flow undisrupted process including an assembly step, a boring step, a first movement step, a replacement step, and a second movement step, wherein:

the assembly step is a step of airtightly enclosing the portion of the existing pipe by the sealing case and attaching the boring machine to the flange of the first separate case without providing an operation valve between the boring machine and the flange;

the boring step is a step in which the cutter passes through the branch hole to form the opening in the portion of the existing pipe;

the first movement step is a step of moving the sealing case in a first direction of the pipe axis direction after the boring step so that the second sealed area surrounds (covers) the opening without the first sealed area covering the opening;

the replacement step is a step of removing the boring machine from the flange together with the cutter after the first movement step, and attaching the valve cover accommodating the gate valve body therein to the flange instead of the boring machine;

the second movement step is a step of moving the sealing case in a second direction, opposite to the first direction, after the replacement step to such a position that allows the gate valve body to be intruded into the opening; and in the first movement step, the second seal ring does not move (pass) completely over the opening but the second seal ring comes into contact with the edge of the opening, temporarily shutting the opening by the second sealed area.

With such a flow-undisrupted process, in the first movement step, the sealing case can be moved in the first direction so as to shut the opening bored, by the cutter by the second sealed area. Therefore, in the replacement step, it is possible to remove the boring machine having the cutter, and attach the valve cover accommodating the valve body therein instead of the boring machine.

Then, in the second movement step, the sealing case can be moved in the second direction opposite to the first direction so as to insert the gate valve body into the existing pipe through the opening.

Thus, it is possible to insert a gate valve body with advantages set forth above, as compared with a case in which an operation valve is additionally used.

BRIEF DESCRIPTION OF THE DRAWINGS

FIG. 1A is a schematic vertical cross-sectional view of a flow-undisrupted apparatus according to an embodiment of the present invention showing a state where a boring machine is attached to a flange, and FIG. 1B is a horizontal, cross-sectional view thereof.

FIGS. 6A and 6B are schematic longitudinal cross-sectional views showing the flow-undisrupted process.

DESCRIPTION OF EMBODIMENTS

Figure 2B:
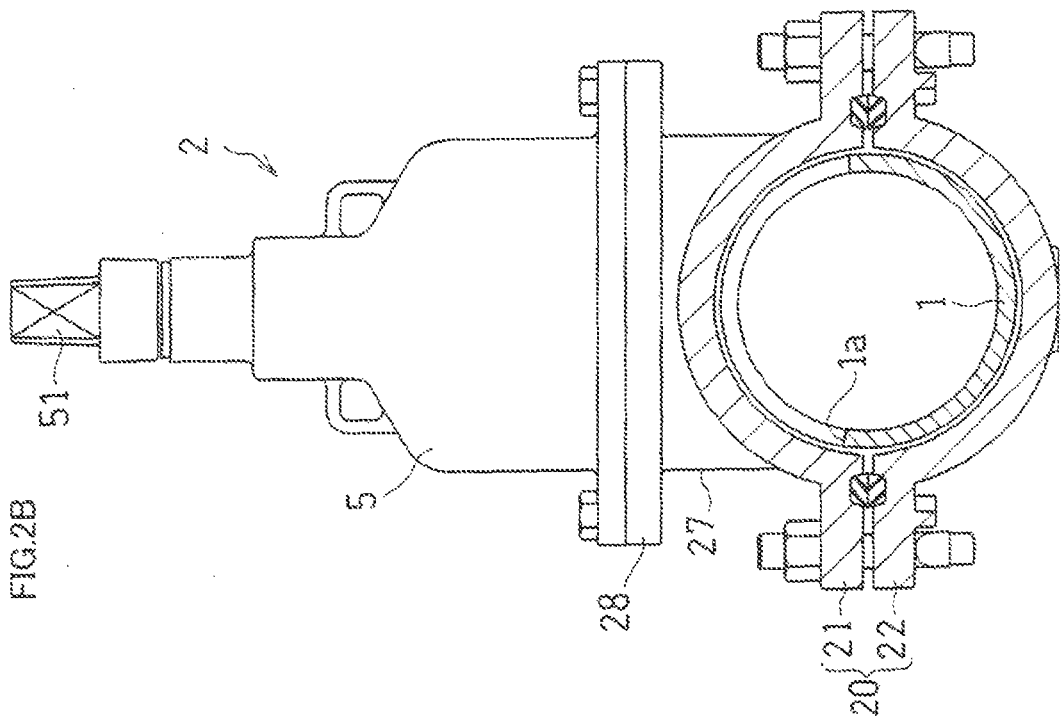
FIG. 2B is a horizontal cross-sectional view thereof.

Preferably, a first portion of the rubber packing forming the first sealed area is formed in a lattice pattern having a through hole through which the cutter passes; and a second portion of the rubber packing forming the second sealed area is formed in a lattice pattern covering a vicinity of the opening in the existing pipe corresponding to the second sealed area.

In this case, since each sealed area is formed by a lattice-shaped rubber packing; the second seal ring will easily deform while escaping into the tolerance space, and will easily deform so as to project into the opening, Preferably, the rubber packing is configured such that the second seed ring comes into cont act with a portion of the existing pipe along an edge of the opening as the rubber packing slides, together with the sealing case, in a direction from the second sealed area toward the first sealed area, and the second sealed area temporarily shuts the opening with the third seal ring in contact with the outer periphery surface of the existing pipe.

In this case, the second seal ring does not need to pass completely over the opening. Therefore, the second seal ring will unlikely be damaged by the edge of the opening.

Preferably, the rubber packing further includes a fourth seal ring and forms a third sealed area between the first seal ring and the fourth seal ring, and another tolerance space similar to the tolerance space is further defined between the first seal ring and the packing attachment groove so that the rubber packing is formed in symmetry with respect to the branch pipe portion.

In this case, since the rubber packing is formed in symmetry with respect to the branch pipe portion, the sealing case may be moved either way along the pipe axis direction. This will improve the reliability of the operation.

EMBODIMENTS

The present invention will be understood mom clearly from the following description of preferred embodiments taken in conjunction with the accompanying drawings. However, the embodiments and the drawings are merely illustrative, and shall not be relied upon in defining the scope of the present invention. The scope of the present invention shall be defined only by the appended claims. In the accompanying drawings, like reference numerals denote like components throughout the plurality of figures.

An embodiment of the present invention will now be described with reference to the drawings.

First, the general configuration of the present apparatus will be described.

Flow-undisrupted apparatus 2:

The present apparatus 2 shown in FIGS. 1 and 2 encloses an existing pipe 1 while a fluid (e.g., water, etc.) is flowing through the existing pipe 1, and is moved in a pipe axis direction L as shown in FIGS. 6A to 7C, for flow-undisrupted boring and for insertion/removal of a valve body, etc.

Separate cases 21 and 22:

As shown in FIG. 1B, the present apparatus 2 includes a sealing case 20. The sealing case 20 includes two separate cases 21 and 22 enclosing a portion of the existing pipe 1.

The first and second separate cases 21 and 22 are separated from each other along a virtual plane that is generally orthogonal to the axis X of a branch pipe portion 27. The pair of separate cases 21 and 22 are attached from outside to the existing pipe 1 from the upper and lower sides in the radial direction C of the existing pipe 1 and are assembled together by fastening coupling portions 25 thereof to each other with assembly bolts 29a and assembly nuts 29b.

As shown in FIG. 1B, the separate cases 21 and 22 each have an inner periphery surface 29 which is curved generally along an outer periphery surface 18 of the existing pipe 1.

The branch pipe portion 2 having a branch-shaped branch hole 23 protruding in the radial direction C of the existing pipe 1 is formed integral with the first case 21 of the plurality of separate cases 21 and 22 shown in FIG. 1A.

Branch pipe portion 27:

A flange 28, e.g., a plate-shaped flange, is formed integral with the branch pipe portion 27, and a boring machine 3 shown in FIG. 1A, a valve cover 5 shown in FIG. 2B, etc., are attached to the flange 28.

Figure 4A:
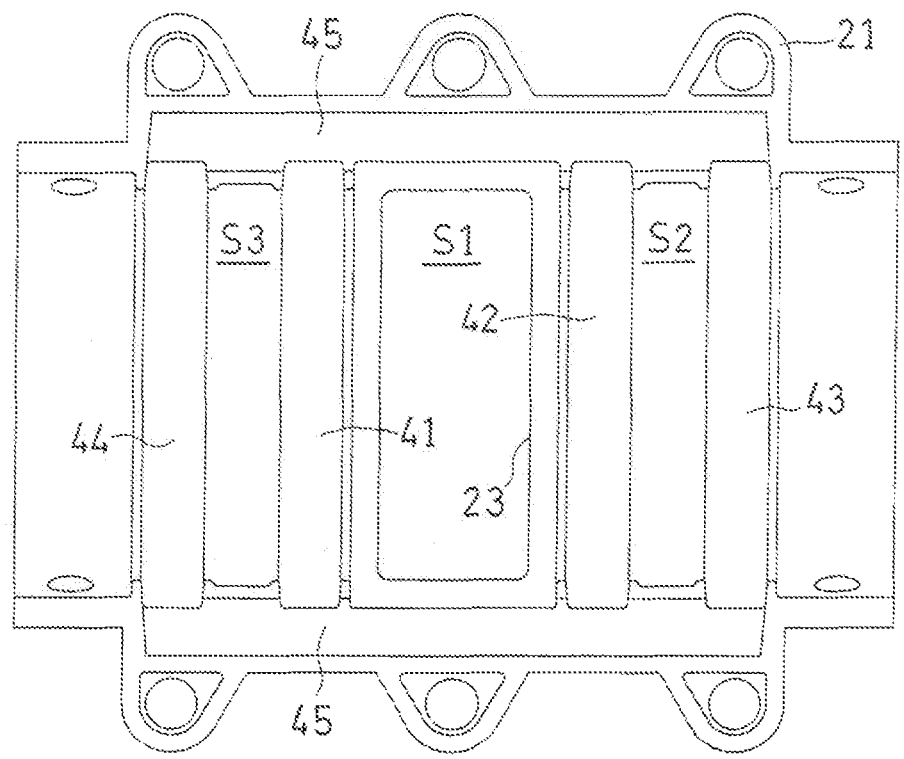
FIG. 4A is a schematic bottom view of a first separate case.
Figure 4B:
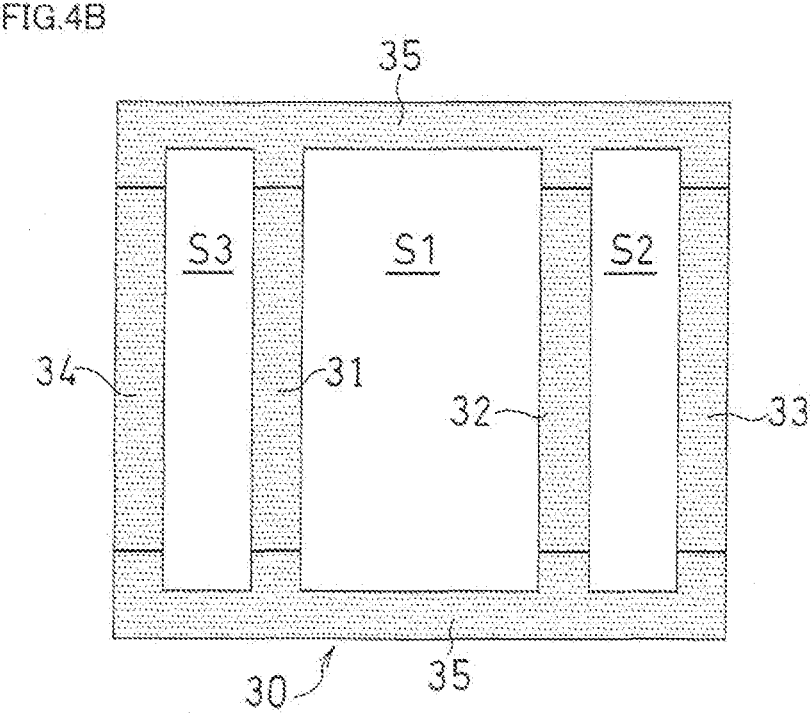
FIG. 4B is a schematic bottom view of a rubber packing.
Figure 4C:
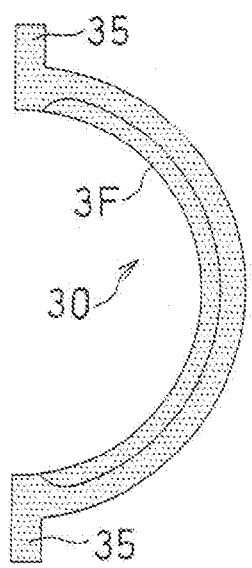
FIG. 4C is a schematic side view of the rubber packing.

Rubber packing 30:

In FIGS. 4B and 4C, a rubber packing 30 is densely dotted.

Figure 3A:
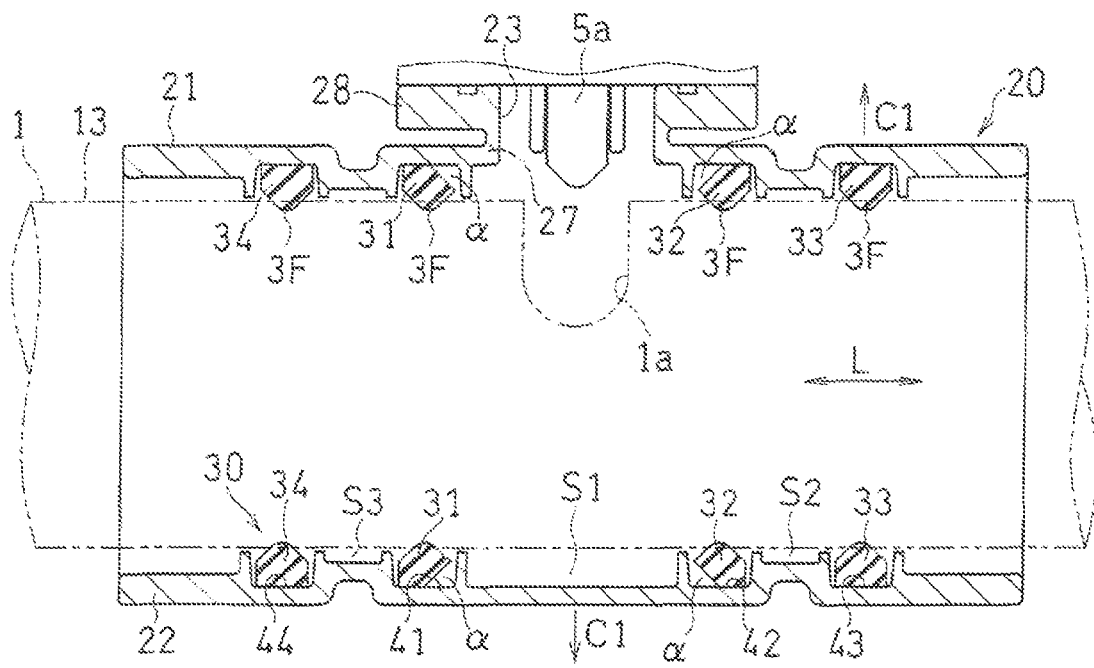
FIG. 3A is a schematic cross-sectional view showing a state where a sealing case is attached to an existing pipe.
Figure 3B:
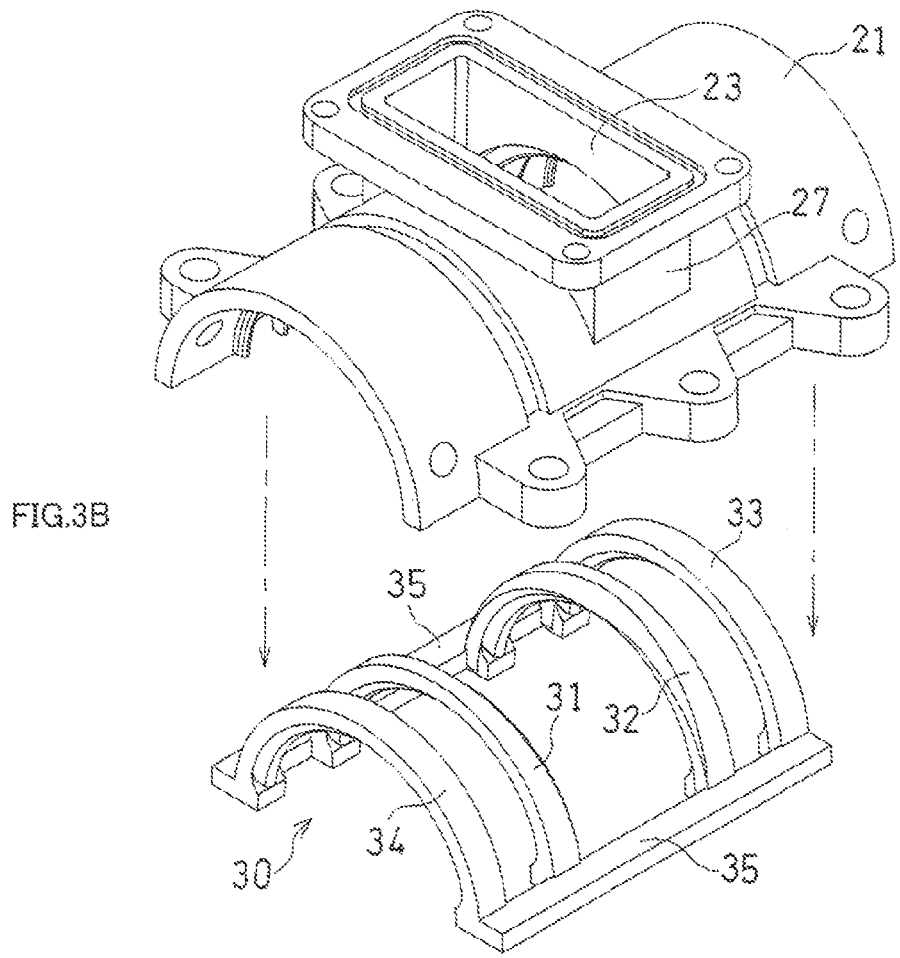
FIG. 3B is an exploded perspective view showing a first separate case and a rubber packing.

As shown in FIG. 4A, the packing attachment portions 41 to 44 formed by grooves in a lattice pattern are formed on the inner surface of the separate case 21 (22). The rubber packing 30 shown in FIG. 3B is attached to the packing attachment portions 41 to 44, and the gap between the existing pipe 1 and the sealing case 20 is sealed by the rubber packing 30 as shown in FIG. 1A.

As shown in FIGS. 3B and 4B, the rubber packing 30 includes first to fourth seal rings 31 to 34 which are semi-circular and half ring-shaped, and two straight portions 35 and 35, which are straight-shaped.

As shown in FIG. 4A, the separate case 21 (22) includes first to fourth depressed portions 41 to 44 and fifth depressed portions 45 and 45 in which the first to fourth seal rings 31 to 34 and the straight portions 35 and 35, respectively, fit.

As shown in FIGS. 4C and 3B, the first to fourth seal rings 31 to 34 each have an inner periphery surface 3F formed in a semi-circular shape so as to closely contact the outer periphery surface 13 of the existing pipe 1. The fifth depressed portions 45 of FIG. 4A are formed in a straight shape so that the straight portions 35 fit therein, and so that when the separate case 21 (22) is attached to the existing pipe 1, the straight portions 35 closely contact each other.

First sealed area S1:

As shown in FIG. 1A, the first seal ring 31 and the second seal ring 32 are arranged on opposite sides (both sides) of the branch hole 23 in the pipe axis direction L. Thus, a first sealed area S1, which surrounds and seals a portion of the sealing case 20 in which the branch hole 23 is provided, is formed between the first seal ring 31 and the second seal ring 32. That is, the first sealed area S1, which shuts the branch hole 23, is formed in a portion corresponding to the branch hole 23.

Second sealed area S2:

As shown in FIG. 3A, a second sealed area S2 is formed between the second seal ring 32 and the third seal ring 33. That is, as shown in FIG. 1A the second sealed area S2 is adjacent to the first sealed area S1 and is sealed against the first sealed area S1. The second sealed area S2 is formed to be displaced from (be next to) the first sealed area S1 in the pipe axis direction L, and sized so as to be able to shut an opening 1a bored with the cutter 3a (FIG. 1A) shown in FIG. 6B.

Third sealed area S3:

As shown in FIG. 3A, a third sealed area S3, similar to the second sealed area S2, is formed between the first seal ring 31 and the fourth seal ring 34. That is, as shown in FIG. 1A, the third sealed area S3 is adjacent to the first sealed area S1 and is sealed against the first sealed area S1. The third sealed area S3 is formed, to be displaced from (be next to) the first sealed area S1 in the pipe axis direction L, and sized so as to be able to shut an opening 1a bored with the cutter 3a (FIG. 1A) shown in FIG. 6B.

Each of the sealed areas S1 to S3 is a sealed space, and the sealed areas S1 to S3 do not communicate with each other.

As shown in FIG. 1B, the straight portions 35 and 35 are provided so as to oppose each other between the coupling portion 25 of the first separate case 21 and the coupling portion 25 of the second separate case 22.

Flow-undisrupted process:

Assembly step:

First, as shown in FIGS. 1A and 1B, a portion of the existing pipe 1 is airtightly enclosed by the sealing case 20, and a boring machine 3 is attached to the first separate case 21 via the flange 28.

That is, as the existing pipe 1 is sandwiched and enclosed from the upper and lower sides by the first separate case 21 and the second separate case 22, the inner periphery surfaces 3F of the first to fourth seal rings 31 to 84 of the rubber packing 30 come into contact with a pipe wall 12 (the outer periphery surface 13) of the existing pipe 1, thereby forming the first sealed area S1 to the third sealed area S3 as shown in FIG. 1A.

Then, the bolt 29a is passed through the coupling portions 25 of the separate cases 21 and 22 shown in FIG. 1B, and the not 29b is screwed onto the bolt 29a, thereby airtightly enclosing a portion of the existing pipe 1 with the sealing case 20.

Figure 5A:
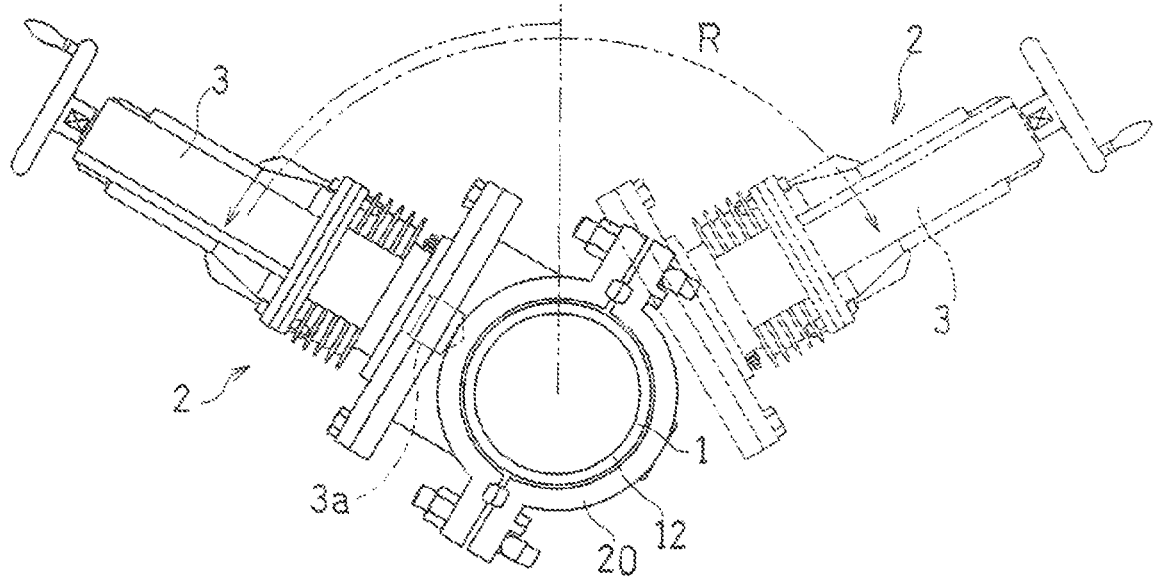
FIGS. 5A and 5B are schematic cross-sectional views showing the flow-undisrupted process.
Figure 5B:
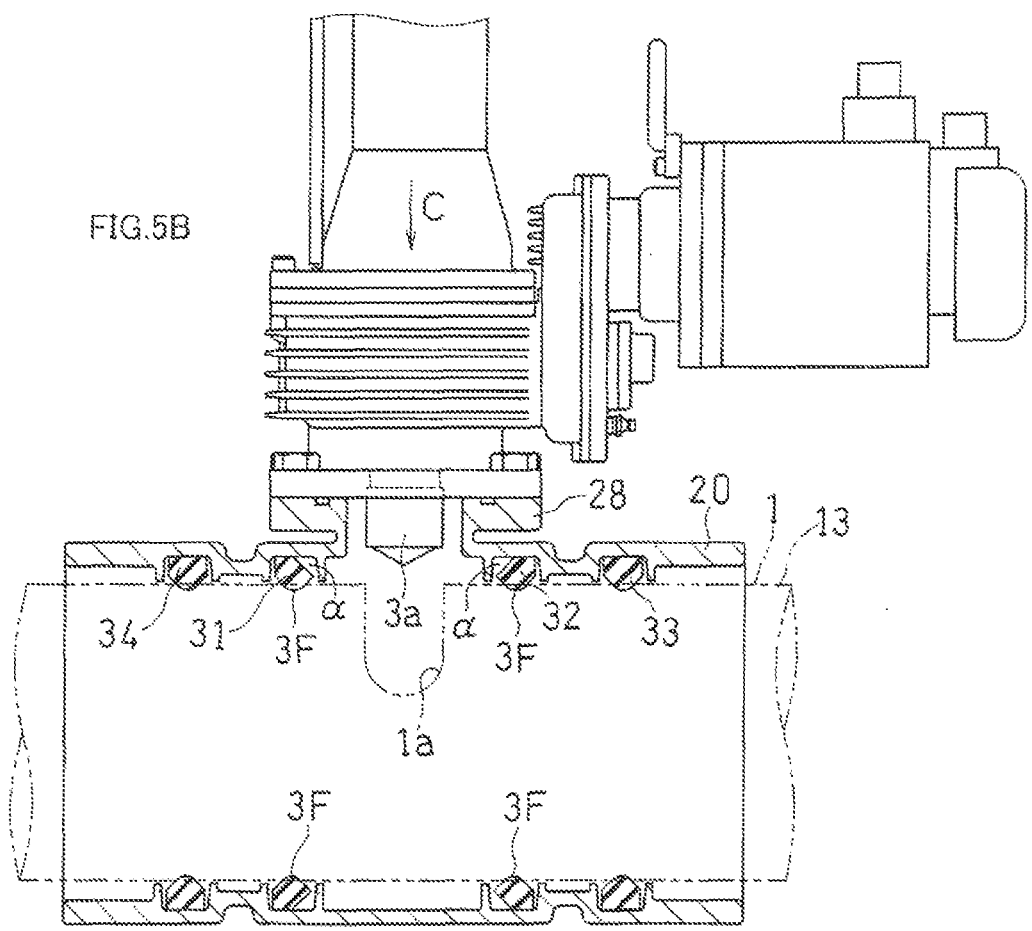

Boring step:

Then, as shown in FIG. 5B, the cutter 3a of the boring machine 3 is moved (lowered) toward the center of the existing pipe 1 so as to bore a portion of the pipe wall 12 (FIG. 5A) of the existing pipe 1 with the cutter 3a of the boring machine 3, and the entire present apparatus 2 of FIG. 5A is rotated in the circumferential direction R while spinning the cutter 3a of the boring machine 3 so as to form a portion of the existing pipe 1 and form the opening 1a extending generally halfway round, as shown in FIG. 5B.

First movement step:

Then, the boring machine 3 is returned to the original position, and the sealing case 20 is slid in the first direction L1 to the position shown in FIGS. 6A and 6B. That is, the sealing case 20 is moved so that the opening 1a is not covered by the first sealed area S1 but the opening 1a is covered (surrounded) by the second sealed area S2 as shown in FIG. 6B.

In the first movement step, as shown in FIGS. 6A and 6B, the second seal ring 32 comes into a contact state with a portion of the existing pipe 1 along the edge 1E of the opening 1a as the rubber packing 30 (FIG. 3) slides, together with the sealing case 20, in the first direction L1. On the other hand, the third seal ring 33 maintains a contact state with the outer periphery surface 18 of the existing pipe 1. By these states of the second seal ring 32 and the third seal ring 33, the second sealed area S2 temporarily shuts the opening 1a.

Replacement step:

Next, the boring machine 3 is removed from the sealing case 20, together with the cutter 3a, after the first movement step.

Herein, the opening 1a is sealed by the second sealed area 82 by the first movement step. Therefore, water flowing through the pipeline of the existing pipe 1 will not gush out of the opening 1a.

Figure 7A:
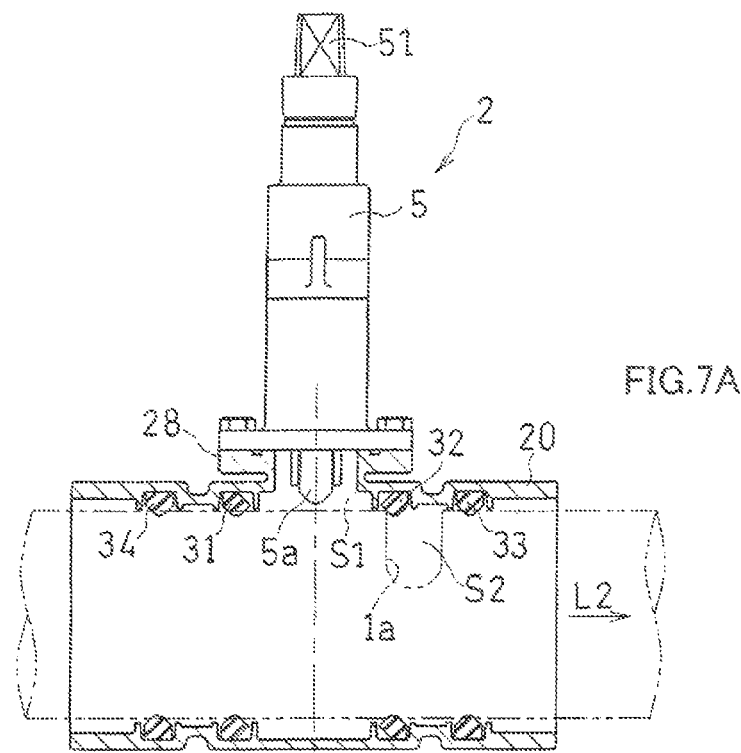
FIGS. 7A, 7B and 7C are schematic longitudinal cross-sectional views showing the flow-undisrupted process.

After the boring machine 3 is removed, the valve cover 5 is attached to the flange 28 of the first separate case 21 as shown in FIG. 7A A valve body 5a capable of being intruded into the existing pipe 1 is provided, in the valve cover 5.

Figure 2A:
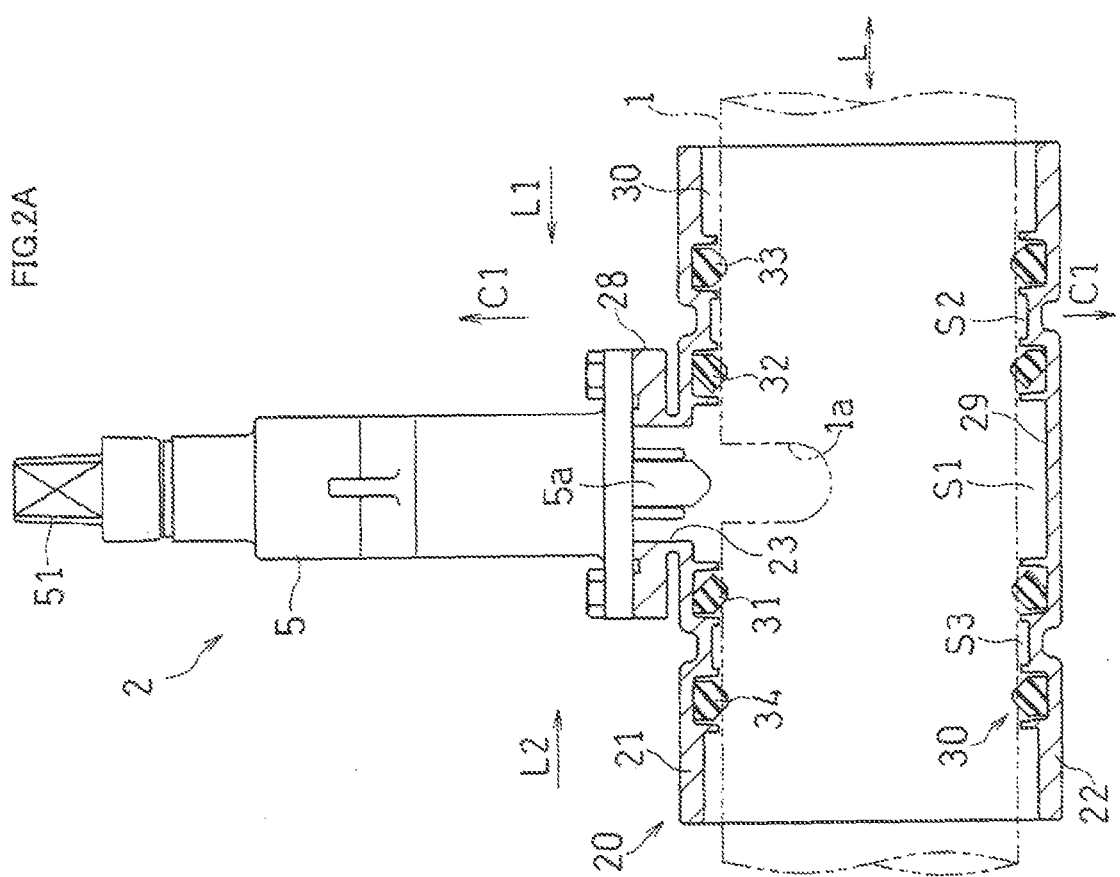
FIG. 2A is a schematic vertical cross-sectional view of the flow undisrupted apparatus showing a state where a valve cover is attached to the flange.
Figure 7B:
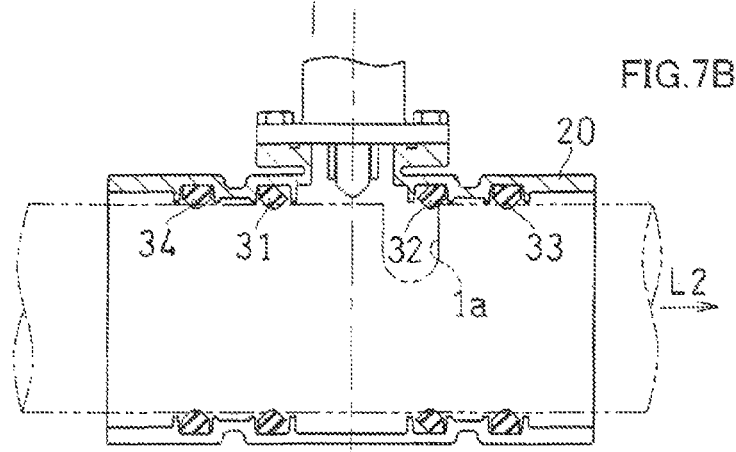
Figure 7C:
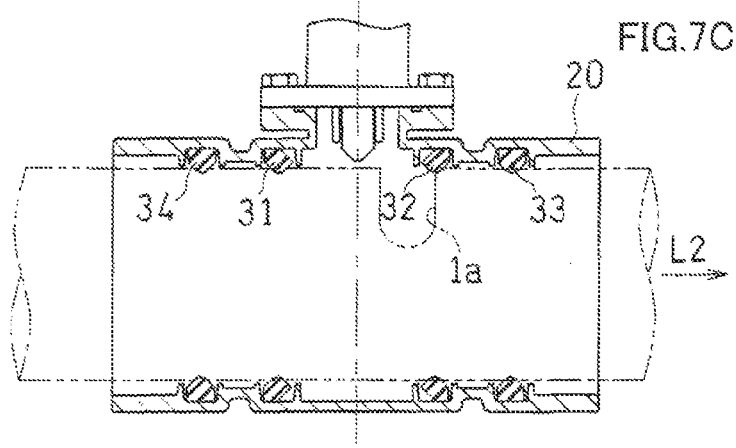

Second movement step:

Then, the sealing case 20 is slid in the second direction L2, opposite to the first direction L1, as shown in FIGS. 7B, 7C and 2A. Through the second movement step, the sealing case 20 is moved to such a position that allows the gate valve body 5a to fee intruded, into the existing pipe 1 through the opening 1a as shown, in FIGS. 2A and 2B.

The second movement step includes, as shown in FIGS. 7A and 7B. a step (a cross step) in which, as the sealing case 20 moves in the second direction 12, the second seal ring 32 moves in the second direction L2 so as to cross the opening 1a. The second movement step also includes a step (a get-over step) in which, as the sealing case 20 further moves in the second direction L2 after the cross step, the second seal ring 82 gets (climbs) over the edge 1E of the opening 1a and moves to such a position that allows the second seal ring 32 to contact with the outer periphery surface 13 of the existing pipe 1 without contacting with the edge 1E of the opening 1, while the second seal ring 32 of FIG. 7C deforms, within the packing attachment groove 42 (FIG. 4A), toward the tolerance space a outward C1 in the radial direction C of the existing pipe 1.

Water-disrupting step:

Then, when an operation portion 51 of the valve cover 5 is rotated, the gate valve body 5a descends, thereby shutting the pipeline of the existing pipe 1 and disrupting water as shown in FIGS. 2A and 2B. After the water disruption, work is performed downstream of the existing pipe 1.

Then, as the operation portion 51 of the valve cover 5 is rotated in the reverse direction, as necessary, the gate valve body 5a ascends.

Where the valve cover 5 and the gate valve body 5a are no longer needed, the sealing case 20 is slid again in the first direction L1 after the gate valve body 5a is ascended.

After the movement, the first sealed area S1 does not cover the opening 1a, with the second sealed area S2 surrounding the opening 1a, as shown in FIG. 7A.

After the movement, the valve cover 5 is removed from the sealing case 20 together with the gate valve body 5a.

Next, characteristic features of the structure and method of the present embodiment will be described in detail.

The rubber packing 30 of FIG. 3A includes the first, second, third and fourth seal rings 31 to 34 defining the first, second and third sealed areas S1, S2 and S3. The rings 31 to 84 are attached respectively to the packing attachment grooves 41 to 44 of the sealing case 20 while being in contact with the outer periphery surface 13 of the existing pipe 1.

Tolerance spaces α and α, whose cross section is triangular, for example, are provided between the first seal ring 31 and the packing attachment groove 41 as well as between the second seal ring 32 and the packing attachment groove 42, wherein the first and second seal rings 31 and 32 are placed on opposite sides of the first sealed area S1. The tolerance spaces a and ct defined on the branch hole 23 side of the outer periphery edge of the first and second seal rings 31 and 32, allow the first or second seal ring 31 or 32 to deform, within the packing attachment grooves 41 and 42, outward C1 in the radial, direction of the existing pipe 1.

Note that in the present embodiment, the tolerance spaces α are provided (formed) as the first and second packing attachment, grooves 41 and 42 each are in left-right symmetry in cross section, whereas corners of the outer periphery edge of each of the first and second seal rings 31 and 32 are not in left-right symmetry but are shaped so that one corner is cut off with respect to (compared to) the other corner.

Thus, the rubber packing 30 is formed in symmetry with respect to the branch pipe portion 27.

As shown in FIGS. 3A, 6A and 6B, in the first movement step, the second seal ring 32 does not move (pass) completely over the opening 1a and the second seal ring 32 comes into contact with an edge 1E of the opening 1a, temporarily shutting the opening 1a by the second sealed area S2.

That is, in the first movement step, as the rubber packing 30 slides in the first direction L1 from the second sealed area S2 toward the first sealed area S1, the second seal ring 32 comes into contact with a portion of the existing pipe 1 along the edge 1E of the opening 1a, and the opening 1a is temporarily shut by the second sealed area S2 with the third seal ring 33 in contact with the outer periphery surface 13 of the existing pipe 1.

On the other hand, in the assembly step of FIG. 1A and the boring step of FIG. 5B, the first and second seal rings 31 and 32 are in contact with the outer periphery surface 13 of the existing pipe 1. In the boring step, on the first and second seal rings 31 and 32, the water pressure of the water discharged from the opening 1a is applied upon the tolerance space α. This achieves a so-called "self-sealed" state, with the inner periphery surface 3F being pressed against the existing pipe 1, and the water-stopping function will therefore not deteriorate.

On the other hand, in the replacement step of FIGS. 6B and 7A, the branch hole 23 communicates with the atmospheric air, and the water pressure is applied from the opening 1a of FIG. 6B, thereby resulting in a single-pressure state.

However, the second seal ring 32 is pressed against and is bitten in by the edge 1E of the opening 1a. Therefore, it will not detract from the water-stopping capability needed for the operation of replacing the boring machine 3 and the gate valve body 5a.

While preferred embodiments have been described above with reference to the drawings, various obvious changes and modifications will readily occur to those skilled in the art upon reading the present specification.

For example, the third sealed area may not be provided.

While the sealing case for enclosing the existing pipe is divided into two pieces, i.e., the first and second separate cases, in the embodiments described above, it may be divided into three or more pieces.

The rubber packing may include a sheet packing for sealing the gap between the separate cases, and a ring packing for sealing the different areas.

The case for enclosing the existing pipe may be a cast product or may be formed by a steel plate. Where it is formed by a steel plate, first and second separate cases, being tentatively assembled together, may be welded together so that the two separate cases are integrated together.

The shape of a hole to be bored is not limited to an arc shape, but may be a circular shape. A circular hole may be formed by a hole saw well known in the art.

Thus, such changes and modifications are deemed to fall within the scope of the present invention, which is defined by the appended claims.

INDUSTRIAL APPLICABILITY

The flow-undisrupted apparatus and the flow-undisrupted process of the present invention can be used for inserting a gate valve body into a line of an existing pipe of water, gas, etc., to disrupt the flow of the fluid with the inserted gate valve body.

REFERENCE SIGNS LIST
1: Existing pipe
13: Outer periphery surface
1a: Opening
1E: Edge
2: flow-undisrupted apparatus
3a: Cutter
12: Pipe wall
20: Sealing case
21: First separate case
22: Second separate case
23: Branch hole
27: Branch pipe portion
28: Flange
30: Rubber packing
3F: inner periphery surface
31-34: First to fourth seal rings
35: Straight portion
41-45: First to fifth depressed portions (packing attachment grooves)
C: Radial direction
C1: Outward
L: Pipe axis direction
L1: First direction
L2: Second direct ion
R: Circumferential direction
S1: First sealed area
S2: Second sealed area
S3: Third sealed area

The invention claimed is:

1. A flow-undisrupted apparatus to which a boring machine including a cutter for boring a portion of a pipe wall of an existing pipe to form an opening in the pipe wall is attached, the flow-undisrupted apparatus allowing the boring machine to be removed therefrom after the opening is formed, the flow-undisrupted apparatus comprising:
 a sealing case including a plurality of separate cases separated from, one another in a circumferential direction of the existing pipe for enclosing a portion of the existing pipe; and
 a rubber packing for sealing a gap between the sealing case and the existing pipe, wherein;
 a branch-shaped branch pipe portion is formed in a first separate case, which is one of the plurality of separate cases, the branch pipe portion defining a branch hole extending in a radial direction of the existing pipe;
 the branch pipe portion of the first separate case is provided with, a flange for allowing for attachment and removal of the boring machine;
 the sealing case is capable of reciprocating in a pipe axis direction of the existing pipe; and
 the rubber packing forms:
  a first sealed area surrounding a portion of the sealing case where the branch hole is provided for sealing the gap between the sealing case and the existing pipe around the branch hole; and
  a second sealed area for temporarily shutting the opening bored, by the cutter, the second sealed area being adjacent to the first sealed area, sealed against the first sealed area, and displaced from the first sealed area in the pipe axis direction;
 the rubber packing includes a first, second and third seal rings forming the first sealed area and the second sealed area;
 each of the rings is attached to a packing attachment groove of the sealing case while being in contact with an outer periphery surface of the existing pipe; and
 between the second seal ring and the packing attachment groove placed between the first and second, sealed areas, a tolerance space is defined on a side of the branch hole of an outer periphery edge of the second seal ring, the tolerance space allowing the second seal ring to deform, within the packing attachment groove, outward in the radial direction of the existing pipe.

2. The flow-undisrupted apparatus according to claim 1, further comprising:
   a gate valve body for disrupting a flow of a fluid through the existing pipe by intruding into an inside of the existing pipe through, the opening formed in the pipe wall; and
   a valve cover accommodating the gate valve body therein, the valve cover being coupled to the first separate case via the flange instead of the boring machine.

3. The flow-undisrupted apparatus according to claim 2, wherein
   a first portion of the rubber packing forming the first sealed area is formed in a lattice pattern having a through hole through which the cutter passes; and
   a second portion of the rubber packing forming the second sealed area is formed in a lattice pattern covering a vicinity of the opening in the existing pipe corresponding to the second sealed area.

4. The flow-undisrupted apparatus according to claim 2, wherein the rubber packing is configured such that the second seal ring comes into contact with a portion of the existing pipe along an edge of the opening as the rubber packing slides, together with the sealing case, in a direction from the second sealed area toward the first sealed area, and the second sealed area temporarily shuts the opening with the third seal ring in contact with the outer periphery surface of the existing pipe.

5. The flow-undisrupted apparatus according to claim 2, wherein the rubber packing further includes a fourth seal ring and forms a third sealed area between the first seal ring and the fourth seal ring, and another tolerance space similar to the tolerance space is further defined between the first seal ring and the packing attachment groove so that the rubber packing is formed in symmetry with respect to the branch pipe portion.

6. A flow-undisrupted process using the flow-undisrupted apparatus according to claim 2, and comprising an assembly step, a boring step, a first movement step, a replacement step, and a second movement step, wherein:
   the assembly step is a step of airtightly enclosing the portion of the existing pipe by the sealing case and attaching the boring machine to the flange of the first separate case without an operation valve intervened;
   the boring step is a step in which the cutter passes through the branch hole to form the opening in the portion of the existing pipe;
   the first movement step is a step of moving the sealing case in a first direction of the pipe axis direction after the boring step so that the second sealed area surrounds the opening without the first sealed area covering the opening;
   the replacement step is a step of removing the boring machine from the flange together with the cutter after the first movement step, and attaching the valve cover accommodating the gate valve body therein to the flange instead of the boring machine; and
   the second movement step is a step of moving the sealing case in a second direction, opposite to the first direction, after the replacement step to such a position that allows the gate valve body to be intruded into the opening;
   in the first movement step, the second seal ring comes into contact with the edge of the opening without moving completely over the opening, temporarily shutting the opening by the second sealed area.

7. The flow-undisrupted process according to claim 6, the second movement step includes:
   a cross step in which, as the sealing case moves in the second direction, the second seal ring moves in the second direction to cross the opening; and
   a get-over step in which, as the sealing case further moves in the second direction after the cross step, the second seal ring gets over the edge of the opening and moves to such a position that allows the second seal ring to contact with the outer periphery surface of the existing pipe without contacting with the edge of the opening, while the second seal ring deforms, within the packing attachment groove, toward the tolerance space outward in the radial direction of the existing pipe.

8. The flow-undisrupted process according to claim 6, wherein, in the first movement step,
   the second sealed area temporarily shuts the opening by the second seal ring coming into a contact state with a portion of the existing pipe along the edge of the opening as the rubber packing slides, together with the sealing case, in the first direction, and by the third, seal ring maintaining a contact state with the outer periphery surface of the existing pipe.

* * * * *